United States Patent
He et al.

(10) Patent No.: US 9,478,092 B2
(45) Date of Patent: Oct. 25, 2016

(54) PLANT SELLING DEVICE AND CONTROL METHOD THEREOF

(71) Applicant: BOE TECHNOLOGY GROUP CO., LTD., Beijing (CN)

(72) Inventors: Lin He, Beijing (CN); Fei Liu, Beijing (CN); Xiaohua Feng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/429,990

(22) PCT Filed: May 27, 2014

(86) PCT No.: PCT/CN2014/078508
§ 371 (c)(1),
(2) Date: Mar. 20, 2015

(87) PCT Pub. No.: WO2015/090001
PCT Pub. Date: Jun. 25, 2015

(65) Prior Publication Data
US 2016/0026164 A1    Jan. 28, 2016

(30) Foreign Application Priority Data
Dec. 17, 2013    (CN) .......................... 2013 1 0695892

(51) Int. Cl.
*G06F 17/00* (2006.01)
*G07F 11/16* (2006.01)
(Continued)

(52) U.S. Cl.
CPC ........... *G07F 11/165* (2013.01); *G05B 19/042* (2013.01); *G06Q 10/087* (2013.01); *G06Q 20/12* (2013.01); *G06Q 30/0635* (2013.01); *G07F 11/00* (2013.01); *G05B 2219/2621* (2013.01); *G06Q 30/06* (2013.01)

(58) Field of Classification Search
None
See application file for complete search history.

(56) References Cited

U.S. PATENT DOCUMENTS 4,311,227 A * 1/1982 Watkins .................. G07F 11/62
194/206
6,123,223 A * 9/2000 Watkins .................. G07F 11/54
108/21

(Continued)

FOREIGN PATENT DOCUMENTS

CN        201289660 Y     8/2009
CN        101816271 A     9/2010

(Continued)

OTHER PUBLICATIONS

Search Report issued in International Application No. PCT/CN2014/078508, nineteen (19) pages.

(Continued)

*Primary Examiner* — Prasad Gokhale
(74) *Attorney, Agent, or Firm* — Nath, Goldberg & Meyer; Joshua B. Goldberg; Tanya E. Harkins (57) ABSTRACT

The present invention discloses a plant selling device and a control method thereof, by which a ripe plant to be sold can be moved from a plant growth room to a sales room according to the information in a purchase order after the purchase order is generated. According to the technical solution of the present invention, plant factory technology can be combined effectively with automatic plant selling so that plants are sold automatically after ripening, thus providing a more convenient mode of production and sale.

15 Claims, 4 Drawing Sheets

(51) Int. Cl.
  *G07F 11/00* (2006.01)
  *G06Q 10/08* (2012.01)
  *G05B 19/042* (2006.01)
  *G06Q 20/12* (2012.01)
  *G06Q 30/06* (2012.01)

(56) References Cited

U.S. PATENT DOCUMENTS

| | | | |
|---|---|---|---|
| 6,474,501 B1 * | 11/2002 | Volpatti | G07F 11/00 221/135 |
| 6,779,684 B2 | 8/2004 | Shin | |
| 2006/0219729 A1 * | 10/2006 | Dobos | A47F 7/0078 221/9 |
| 2008/0172938 A1 * | 7/2008 | Azoulay | A01G 9/247 47/61 |
| 2010/0152892 A1 * | 6/2010 | Gavra | G07F 11/54 700/232 |

FOREIGN PATENT DOCUMENTS

| | | |
|---|---|---|
| CN | 102402817 A | 4/2012 |
| CN | 102651154 A | 8/2012 |
| CN | 102668964 A | 9/2012 |
| CN | 103270907 A | 9/2013 |
| CN | 103400451 A | 11/2013 |
| CN | 103700012 A | 4/2014 |
| WO | 0169552 A1 | 9/2001 |

OTHER PUBLICATIONS

Chinese Patent Office Action issued Sep. 4, 2014 and English translation, seventeen (17) pages.
Chinese Patent Office Action issued Jan. 12, 2015, five (5) pages.

* cited by examiner

PLANT SELLING DEVICE AND CONTROL METHOD THEREOF

This is a National Phase Application filed under 35 U.S.C. 371 as a national stage of PCT/CN2014/078508, filed May 27, 2014, and claims priority benefit from Chinese Application No. 201310695892.7, filed Dec. 17, 2013, the content of each of which is hereby incorporated by reference in its entirety.

FIELD OF THE INVENTION

The present invention relates to a plant selling device and a control method thereof, and particularly relates to a plant selling device combined with a plant growth room and a control method thereof.

BACKGROUND OF THE INVENTION

Along with the gradual improvement of people's living standard and the change of their demand for food, the healthy, unpolluted, environmental friendly and convenient lifestyle is drawing more and more attention, hygienic, nutritious and healthy food is becoming more and more popular, in which the unpolluted, fresh and clean vegetable products are especially important to people's modern life. And how to produce these vegetables conveniently and quickly becomes a hot topic concerned by people.

As an up-to-date technology for plant cultivation, a plant factory has provided an optimum environment for growth and development of plants. Chinese patent application CN 102668964A discloses a plant factory which can be used for supermarkets and restaurants to market their own products of various plant foods, used in such special environments as plateau, desert, underground, arctic regions and space stations to meet the continuous supply demands of people working and living there for plant food, and used for households to produce fresh vegetables by their own, the entirety of which is incorporated herein by reference.

However, the plant factory according to the prior art is only used in the automatic planting of plants, unable to automatically sell ripe plants.

SUMMARY OF THE INVENTION

In embodiments of the present invention, provided is a plant selling device and a control method thereof by which plants in a plant factory are sold automatically after ripening.

According to one aspect of the present invention, provided is an plant selling device, including: a plant growth room in which trays are provided, a plant to be sold growing in one of the trays before the plant is sold; a sales room with an opening; a conveyor; and a central control unit. The central control unit includes: a purchase order generating unit for generating purchase order; a movement control unit for controlling movements of the trays and the conveyor so that a ripe plant to be sold is moved from the plant growth room to the sales room according to information in the purchase order; a payment order generating unit for generating a payment order according to an actual weight of the plant moved to the sales room; and an opening control unit for controlling the opening of the sales room to be opened after it is determined that a purchaser has paid the amount in the payment order.

In an embodiment according to the concept of the present invention, the device may further include: a display unit for displaying information of purchasable plants; and an input unit by which a purchaser chooses the purchasable plants. The purchase order generating unit can generate a purchase order according to information input by a purchaser via the input unit.

In an embodiment according to the concept of the present invention, the display unit and the input unit may be integrated in a touch-sensitive display panel.

In an embodiment according to the concept of the present invention, the movement control unit may, according to the information in the purchase order, perform the following operations: moving the conveyor into the plant growth room; controlling the conveyor to acquire the ripe plant to be sold in the plant growth room; and moving the conveyor carrying the plant to be sold to the sales room.

In an embodiment according to the concept of the present invention, after the conveyor is moved into the plant growth room, the movement control unit may control the conveyor to acquire a tray carrying the ripe plant to be sold, and move the tray along with the conveyor to the sales room after the tray is acquired.

In an embodiment according to the concept of the present invention, after it is determined that the purchaser has taken out the purchased plant, the movement control unit may control the conveyor to convey the empty tray back to the plant growth room, and may update information of purchasable plants; or after it is determined that the purchaser has given up the purchase, the movement control unit may control the conveyor to convey the tray carrying the plant back to the plant growth room.

In an embodiment according to the concept of the present invention, the conveyor may be a manipulator, an elevator, a conveyor belt, or a combination thereof.

In an embodiment according to the concept of the present invention, a seeder, a growing environment control device and a monitor may be further included in the plant growth room, and the central control unit may also include: a sowing control unit for controlling the seeder so as to, when it is determined that a tray provided in the plant growth room carries no plants, sow seeds in the tray according to an identification information of the tray; a growing environment control unit for controlling the growing environment control device to provide plants in the plant growth room with a corresponding growing environment; an image acquiring unit for acquiring images of the plants in the plant growth room via the monitor; and a growth phase determining unit for determining growth phases of the plants according to the images of the plants acquired by the image acquiring unit.

In an embodiment according to the concept of the present invention, when it is determined that the plants in the plant growth room are ripe, the growing environment control unit may control the growing environment control device to provide the plants in the plant growth room with a fresh-keeping environment, and update information of purchasable plants.

In an embodiment according to the concept of the present invention, a collecting device may be provided in the plant growth room, and when it is determined that a plant in a tray within the plant growth room is unsuitable for sale, the movement control unit may control the movement of the tray to convey the plant in the tray into the collecting device, and update information of purchasable plants.

In an embodiment according to the concept of the present invention, separators may be provided in the plant growth room to divide the plant growth room into a plurality of zones corresponding to different growth phases of plants. The movement control unit may control the movements of the trays within the plant growth room to move a tray to a corresponding zone in the plurality of zones according to a growth phase of a plant in the tray, and the growing environment control unit may control the growing environment control device to provide each zone with a corresponding growing environment or fresh-keeping environment.

According to another aspect of the present invention, provided is a method for controlling a plant selling device, wherein the plant selling device includes: a plant growth room in which trays are provided, a plant to be sold growing in one of the tray before the plant is sold; a sales room with an opening; and a conveyor. The method includes the steps of generating a purchase order; controlling movements of the trays and the conveyor so that a ripe plant to be sold is moved from the plant growth room to the sales room according to information in the purchase order; generating a payment order according to an actual weight of the plant moved to the sales room; and controlling the opening of the sales room to be opened after it is determined that the purchaser has paid the amount in the payment order.

In an embodiment according to the concept of the present invention, a seeder, a growing environment control device and a monitor may be further included in the plant growth room, and the method may further include the following steps: when it is determined that a tray provided in the plant growth room carries no plants, controlling the seeder to sow seeds in the tray carrying no plants according to an identification information of the tray; controlling the growing environment control device to provide plants in the plant growth room with a corresponding growing environment; acquiring images of the plants in the plant growth room via the monitor; and determining growth phases of the plants according to the acquired images of the plants. When it is determined that the plants in the plant growth room are ripe, the growing environment control device may be controlled to provide the plants in the plant growth room with a fresh-keeping environment, and update information of purchasable plants.

BRIEF DESCRIPTION OF THE DRAWINGS

FIG. 2 is a structural schematic diagram of a central control unit of the plant selling device shown in FIG. 1a;

DETAILED DESCRIPTION OF THE EMBODIMENTS

A plant selling device and a control method thereof according to embodiments of the concept of the present invention are further described below in detail in conjunction with the accompanying drawings.

It should be recognized that the size and shape of each component in the figures are not drawn to scale, but only for a purpose of exemplary explaining the present invention.

Figure 1A:
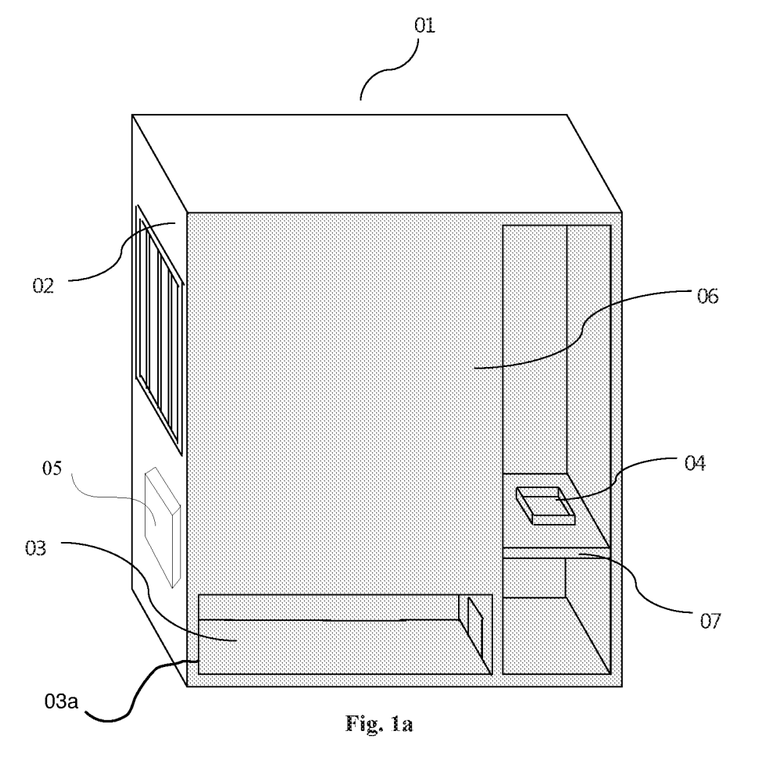
FIGS. 1a and 1b are respectively structural schematic diagrams of a plant selling device according to an embodiment of the concept of the present invention.
Figure 1B:
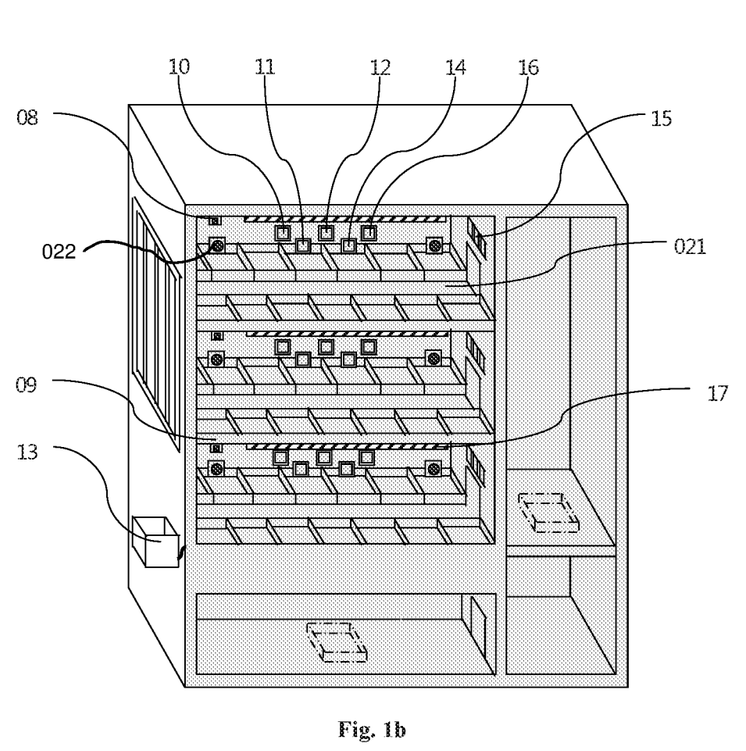
Figure 2:
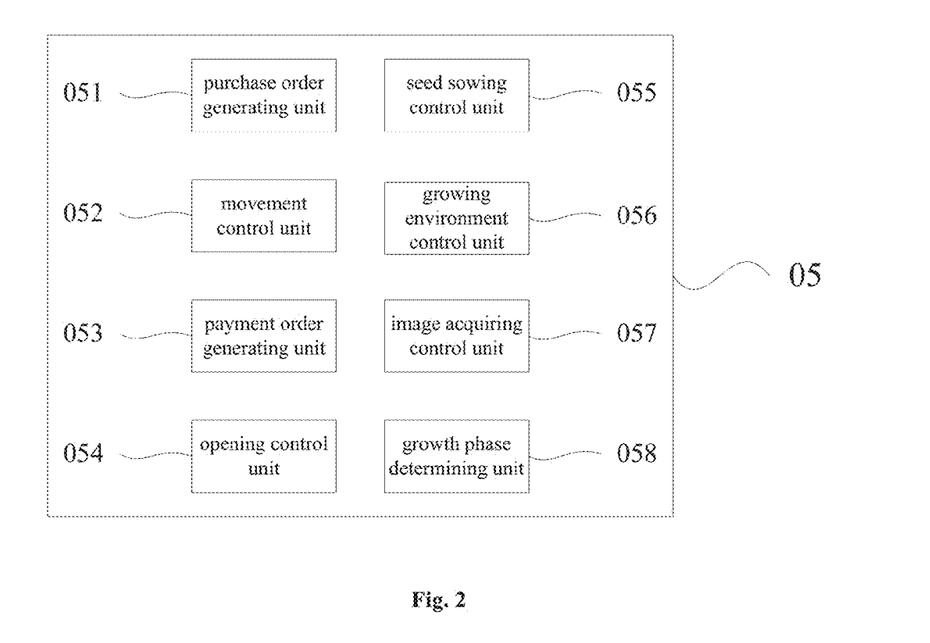

FIGS. 1a and 1b are respectively structural schematic diagrams of a plant selling device according to an embodiment of the concept of the present invention, and FIG. 2 is a structural schematic diagram of a central control unit of the plant selling device shown in FIG. 1a.

As shown in FIGS. 1a, 1b and 2, the plant selling device according to an embodiment of the concept of the present invention may include a cabinet body 01, a plant growth room 02 provided with trays 04, a sales room 03 with an opening 03a, a conveyor 07 and a central control unit 05. The central control unit 05 may include a purchase order generating unit 051 for generating a purchase order, a movement control unit 052 for controlling movements of the trays 04 and the conveyor 07 so that a ripe plant is moved from the plant growth room 02 to the sales room 03 according to information in the purchase order, a payment order generating unit 053 for generating a payment order according to an actual weight of the plant moved to the sales room 03 and an opening control unit 054 for controlling the opening 03a of the sales room 0:3 to be opened after it is determined that a purchaser has paid the amount in the payment order. Preferably or additionally, after the purchaser has taken out the purchased plant, the opening control unit 054 may control the opening 03a of sales room 03 to be closed.

The plant selling device according to an embodiment of the concept of the present invention may also include a display and input unit 06 for displaying information of purchasable plants, and a purchaser can choose the purchasable plants. The purchase order generating unit 051 may generate a purchase order according to information input by a purchaser. Preferably, the display and input unit 06 can be implemented as a touch-sensitive display panel.

The movement control unit 052 may perform the following operations according to the information in the purchase order: moving the conveyor 07 into the plant growth room 02; controlling the conveyor 07 to acquire the ripe plant to be sold in the plant growth room 02; and moving the conveyor 07 carrying the plant to be sold to the sales room 03. Specifically, after the conveyor 07 is moved to the plant growth room 02, the movement control unit 052 may control the conveyor 07 to acquire a tray 04 carrying the ripe plant to be sold, and move the tray 04 along with the conveyor 07 to the sales room 03 after the tray 04 is acquired. FIG. 1a shows the state in which the conveyor 07 has acquired the tray 04. In addition, after it is determined that the purchaser has taken out the purchased plant, the movement control unit 052 may control the conveyor 07 to convey the empty tray 04 back to the plant growth room 02, and update the information of the purchasable plants; or after it is determined that the purchaser has given up the purchase, the movement control unit 052 may control the conveyor 07 to convey the tray 04 carrying the plant back to the plant growth room 02. The conveyor 07 may be a manipulator, an elevator, a conveyor belt, or a combination thereof.

For the plant selling device according to an embodiment of the concept of the present invention, as shown in FIG. 1b, a seeder 08, a growing environment control device and a monitor 022 may be also included in the plant growth room 02. Correspondingly, the central control unit 05 may further include a sowing control unit 055, a growing environment control unit 056, an image acquiring unit 057 and a growth phase determining unit 058.

The sowing control unit 055 controls the seeder 08 to sow seeds in a tray 04 according to an identification information of the tray 04 when it is determined that the tray 04 in the plant growth room 02 carries no plants. The growing environment control unit 056 is used for controlling the growing environment control device to provide plants in the plant growth room 02 with a corresponding growing environment.

The image acquiring control unit 057 is used for acquiring images of the plants in the plant growth room 02 via the monitor 022. The growth phase determining unit 058 is used for determining growth phases of the plants according to the images of the plants acquired by the image acquiring unit 057.

When it is determined that the plants in the plant growth room 02 are ripe, the growing environment control unit 056 controls the growing environment control device to provide the plants in the plant growth room 02 with a fresh-keeping environment, and can update the information of the purchasable plants.

In an embodiment according to the concept of the present invention, a collecting device (not shown) may be provided in the plant growth room 02, and when it is determined that a plant in a tray 04 within the plant growth room 02 is unsuitable for sale, the movement control unit 052 can control the movement of the tray 04 to convey the plant in the tray 04 into the collecting device, and update the information of the purchasable plants.

In an embodiment according to the concept of the present invention, separators 09 may be provided in the plant growth room 02 to divide the plant growth room 02 into a plurality of zones 021 corresponding to different growth phases of the plants. The movement control unit 052 may control the movements of the trays 04 within the plant growth room 02 to move a tray 04 to a corresponding zone in the plurality of zones 021 according to a growth phase of a plant in the tray 04. The growing environment control unit 056 may control the growing environment control device to provide each zone 021 with a corresponding growing environment or fresh-keeping environment.

For the plant selling device according to an embodiment of the concept of the present invention, as shown in FIG. 1b, the growing environment control device may include various sensors and devices, such as (but not limited to) a temperature sensing and adjusting device 10, a humidity sensing and adjusting device 11, a sensor 12 capable of acquiring a liquid level of a nutrient solution in a tray 04, a nutrient solution feed device 13 capable of replenishing the nutrient solution in the tray 04, a carbon dioxide sensor 14 capable of acquiring the carbon dioxide content, a carbon dioxide regulator 15 capable of regulating a carbon dioxide content of a plant, an illumination intensity sensor 16 and an illuminator 17. For example, the illuminator 17 may be an LED illuminating panel or an OLED illuminating panel, which emits white light.

By means of the description of the above embodiments, the person skilled in the art can clearly understand that the central control unit 05 included in the plant selling device according to an embodiment of the concept of the present invention may be implemented via software, firmware, hardware or a combination thereof.

Figure 3:
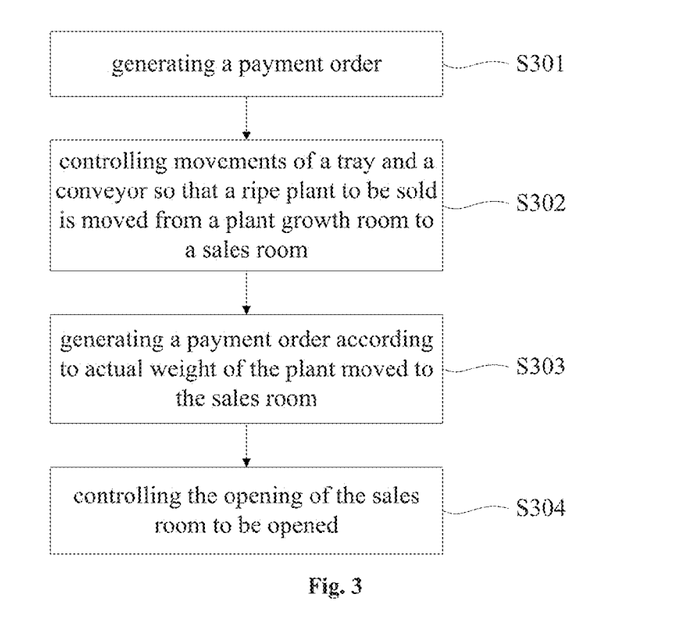
FIG. 3 is a flowchart of a method for controlling the plant selling device according to an embodiment of the concept of the present invention.

FIG. 3 is a flowchart of a method for controlling a plant selling device according to an embodiment of the concept of the present invention.

As shown in FIG. 3, the method may include the following steps of:

S301, generating a purchase order;

S302, controlling movements of trays and a conveyor so that a ripe plant to be sold is moved from a plant growth room to a sales room according to information in the purchase order;

S303, generating a payment order according to an actual weight of the plant moved to the sales room; and S304, controlling the opening of the sales room to be opened after it is determined that a purchaser has paid the amount in the payment order.

Specifically, in the step of generating a purchase order, a purchase order may be generated according to information input by the purchaser. In addition, in the step of controlling the movement of the trays and the conveyor, the following operations may be performed according to the information in the purchase order: moving the conveyor into the plant growth room; controlling the conveyor to acquire the ripe plant to be sold in the plant growth room; and moving the conveyor carrying the plant to be sold to the sales room. Specifically, after the conveyor is moved into the plant growth room, the conveyor may be controlled to acquire a tray carrying the ripe plant to be sold, and the tray along with the conveyor may be moved to the sales room after the tray is acquired.

Preferably or additionally, after it is determined that the purchaser has taken out the purchased plant, the conveyor may be controlled to convey the empty tray back to the plant growth room, and information of purchasable plants may be updated; or after it is determined that the purchaser has given up the purchase, the conveyor may be controlled to convey the tray carrying the plant back to the plant growth room.

Preferably or additionally, the method may further include the following steps of:

confirming whether the purchased plant needs to be washed and/or packaged according to the information input by a purchaser;

washing the purchased plant when it is confirmed that washing is needed and after it is determined that the purchaser has paid the amount in the payment order; and packaging the purchased plant when it is confirmed that the purchased plant needs to be packaged and after it is determined that the purchaser has paid the amount in the payment order.

Figure 4:
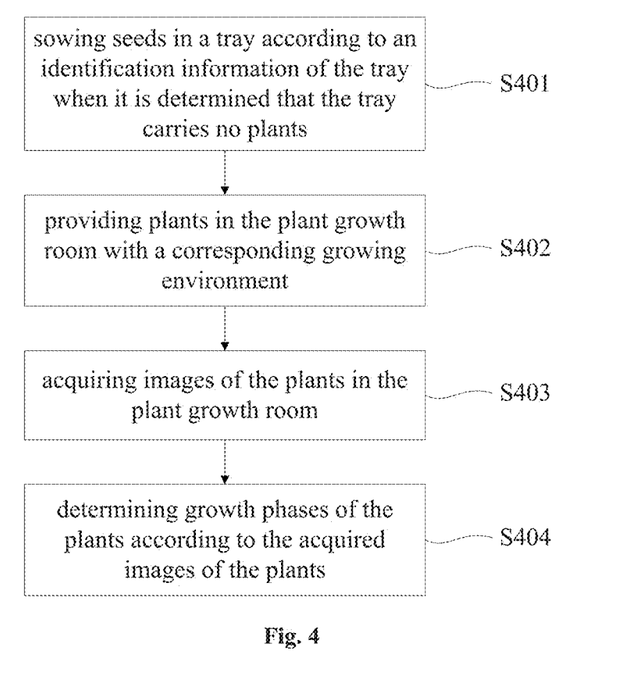
FIG. 4 is a flowchart of the method for monitoring growth of plants in the plant selling device according to an embodiment of the concept of the present invention.

FIG. 4 is a flowchart of a method for monitoring growth of a plant in a plant selling device according to an embodiment of the concept of the present invention.

The method may include the following steps of:

S401, controlling a seeder to sow seeds in a tray according to an identification information of the tray when it is determined that the tray provided in a plant growth room carries no plants;

S402, controlling the growing environment control device to provide the plants in the plant growth room with a corresponding growing environment.

S403, acquiring images of the plants in the plant growth room via a monitor; and S404, determining growth phases of the plant according to the acquired the images of the plants.

Preferably or additionally, when it is determined that the plants in the plant growth room are ripe, the growing environment control device may be controlled to provide the plants in the plant growth room with a fresh-keeping environment, and update the information of the purchasable plants.

Specifically, the fresh-keeping environment may be set so that the temperature is kept at 0-5° C. or so, and the illumination provided for the plant is stopped. It is facilitated to prolong storage time of the plants by using the growing environment control device to keep the ripe plant in a fresh-keeping environment.

Preferably or additionally, when it is determined that a plant in a tray within the plant growth room is unsuitable for sale, the movement of the tray may be controlled to convey the plant in the tray into a collecting device, and the information of the purchasable plants may be updated.

According to an embodiment of the concept of the present invention, the growth phases of the plants in the plant growth room may be monitored. After a plant is ripe, a fresh-keeping environment is provided for the ripe plant, and the information of the purchasable plants may be updated; when a plant is unsuitable for sale, the plant is collected so as not to disadvantageously affect other plants in the plant growth room, and the information of the purchasable plants is updated. Therefore, the plant selling device according to the embodiments of the present invention may adjust the information of the purchasable plants at any time according to ripeness of a plant in the plant growth room.

Preferably or additionally, the movement of the tray within the plant growth room may be controlled so as to, according to the growth phase of the plant in the tray, move the tray to a zone corresponding to the growth phase, and respective zones corresponding to different growth phases may be provided with corresponding growing environments or fresh-keeping environments.

It can be understood by the person skilled in the art that the drawings in this application only schematically illustrate embodiments according to the present invention, the concept of the present invention can be implemented according to ways other than the flow shown in the drawings, and the modules shown in the drawings can be incorporated or divided into new modules.

Various modifications and variations can be made by the person skilled in the art without departing from the spirit and essence of the present invention. The present invention intends to cover all of these modifications and variations.

The invention claimed is:

1. A plant selling device, comprising:
   a plant growth room in which trays are provided, a plant to be sold growing in one of the trays before the plant is sold;
   a sales room with an opening;
   a conveyor; and
   a central control unit, comprising:
      a purchase order generating unit for generating a purchase order;
      a movement control unit for controlling movements of the trays and the conveyor by moving the conveyor to the plant growth room, controlling the conveyor to acquire a ripe plant in the plant growth room and moving the conveyor carrying the plant to be sold to the sales room according to information in the purchase order;
      a payment order generating unit for generating a payment order according to an actual weight of the plant moved to the sales room; and
      an opening control unit for controlling the opening of the sales room to be opened after it is determined a purchaser has paid the payment order.

2. The device according to claim 1, further comprising:
   a touch-sensitive display unit comprising:
      a display unit for displaying information of purchasable plants; and
      an input unit by which the purchaser chooses the purchasable plants,
      wherein the purchase order generating unit generates the purchase order according to information input by the purchaser via the input unit of the touch-sensitive display unit.

3. The device according to claim 1, wherein after the conveyor is moved into the plant growth room, the movement control unit controls the conveyor to acquire the tray carrying the ripe plant to be sold, and moves the tray along with the conveyor to the sales room after the tray is acquired.

4. The device according to claim 1, wherein said conveyor is a manipulator, an elevator, a conveyor belt, or a combination thereof.

5. The device according to claim 1, wherein a seeder, a growing environment control device and a monitor are further included in the plant growth room, and the central control unit further comprises:
   a sowing control unit for, when it is determined that a tray provided in the plant growth room carries no plants, controlling the seeder to sow seeds in the tray carrying no plants according to an identification information of the tray;
   a growing environment control unit for, when it is determined that a plant in the plant growth room requires an environmental adjustment, controlling the growing environment control device to provide plants in the plant growth room with a corresponding growing environment;
   an image acquiring control unit for acquiring images of the plants in the plant growth room via the monitor; and
   a growth phase determining unit for determining growth phases of the plants according to the images of the plants acquired by the image acquiring control unit.

6. The device according to claim 5, wherein when it is determined that the plants in the plant growth room are ripe, the growing environment control unit controls the growing environment control device to provide the plants in the plant growth room with a fresh-keeping environment, and updates information of purchasable plants.

7. The device according to claim 5, wherein a collecting device is provided in the plant growth room, and
   when it is determined that a plant in a tray within the plant growth room is unsuitable for sale, the movement control unit controls the movement of the tray to convey the plant in the tray into the collecting device, and updates information of purchasable plants.

8. The device according to claim 5, wherein separators are provided in the plant growth room to divide the plant growth room into a plurality of zones corresponding to different growth phases of the plants,
   the movement control unit controls the movements of the trays within the plant growth room so as to, according to a growth phase of a plant in a tray, move the tray to a corresponding zone in the plurality of zones; and
   the growing environment control unit controls the growing environment control device to provide each zone with a corresponding growing environment or fresh-keeping environment.

9. A method for controlling a plant selling device, wherein the plant selling device comprises:
   a plant growth room in which trays are provided, a plant to be sold growing in one of the trays before the plant is sold;
   a sales room with an opening; and
   a conveyor,
   the method comprises the following steps of:
   generating a purchase order;
   controlling movements of the trays and the conveyor by moving the conveyor into the plant growth room, controlling the conveyor to acquire a ripe plant in the plant growth room and moving the conveyor carrying the plant to be sold to the sales room according to information in the purchase order;

generating a payment order according to an actual weight of the plant moved to the sales room; and controlling the opening of the sales room to be opened after it is determined a purchaser has paid the payment order.

10. The method according to claim 9, wherein the plant selling device further comprises a display unit for displaying information of purchasable plants and an input unit by which the purchaser chooses the purchasable plants, wherein in the step of generating a payment order, the purchase order is generated according to the information input by the purchaser via the input unit.

11. The method according to claim 9, further comprising the following steps of:

controlling the conveyor to convey the empty tray back to the plant growth room, and updating information of purchasable plants after the purchaser has taken out the purchased plant; or controlling the conveyor to convey the tray carrying the plant back to the plant growth room after the purchaser has given up the purchase.

12. The method to claim 9, wherein a seeder, a growing environment control device and a monitor are further included in the plant growth room, and the method further comprises the following steps of:

controlling the seeder to sow seeds in a tray provided in the plant growth room according to an identification information of the tray when it is determined that the tray carries no plants;

controlling the growing environment control device to provide plants in the plant growth room with a corresponding growing environment;

acquiring images of the plants in the plant growth room via the monitor; and determining growth phases of the plants according to the acquired images of the plants.

13. The method according to claim 12, wherein it is determined that the plants in the plant growth room are ripe, the growing environment control device is controlled to provide the plants in the plant growth room with a fresh-keeping environment, and information of purchasable plants is updated.

14. The method according to claim 12, wherein a collecting device is provided in the plant growth room, and the method further comprise the following steps of:

when it is determined that a plant in a tray within the plant growth room is unsuitable for sale, controlling the movement of the tray to convey the plant in the tray into the collecting device, and updating information of purchasable plants.

15. The method according to claim 12, wherein separators are provided in the plant growth room to divide the plant growth room into a plurality of zones corresponding to different growth phases of the plants, and the method further comprising the following steps of:

controlling the movements of the trays within the plant growth room to move a tray to a corresponding zone in the plurality of zones according to a growth phase of a plant in the tray, and controlling the growing environment control device to provide each zone with a corresponding growing environment or fresh-keeping environment.

* * * * *